A. C. GORTON AND G. R. CARR.
FILTER.
APPLICATION FILED OCT. 20, 1919.
1,337,066.
Patented Apr. 13, 1920.
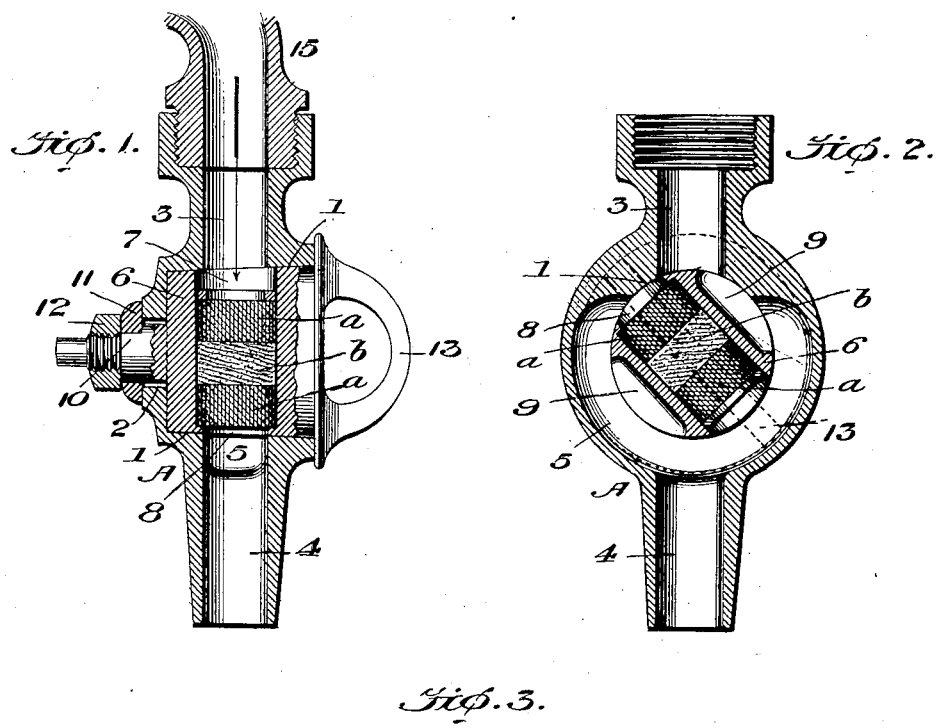
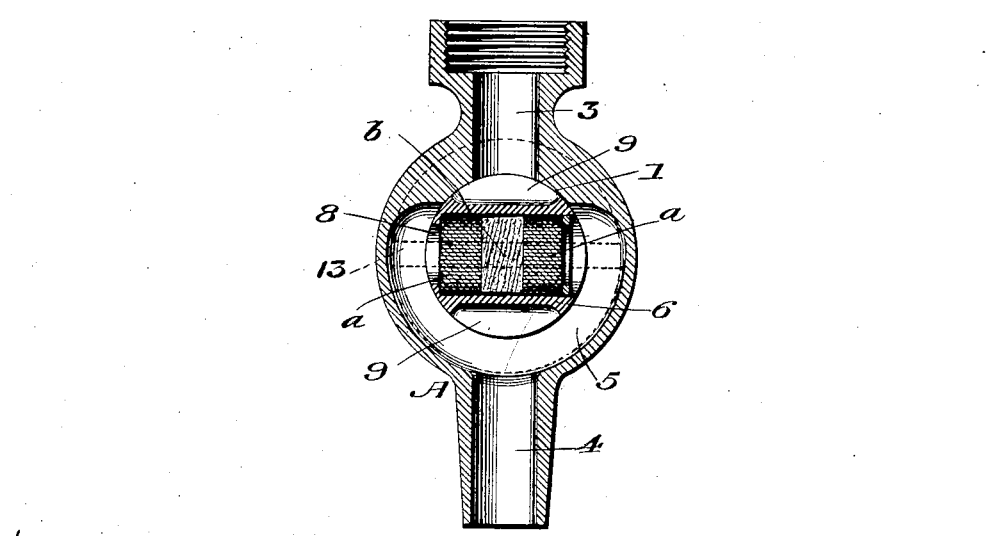

UNITED STATES PATENT OFFICE.

ARTHUR C. GORTON AND GEORGE R. CARR, OF TITUSVILLE, PENNSYLVANIA.

FILTER.

1,337,066. Specification of Letters Patent. Patented Apr. 13, 1920.

Application filed October 20, 1919. Serial No. 331,765.

*To all whom it may concern:*

Be it known that we, ARTHUR C. GORTON and GEORGE R. CARR, citizens of the United States, residing at Titusville, in the county of Crawford and State of Pennsylvania, have invented certain new and useful Improvements in Filters, of which the following is a specification.

Our invention relates to an improvement in filters.

The object is to provide a faucet filter which is durable, simple and efficient in construction, and is reversible and self-cleaning, thus making it perfectly sanitary.

With these objects in view, this invention is composed in the main of two simple parts, one in the form of a casing which has a passage therethrough lengthwise, and is provided with a transverse cylindrical bore, in the wall of which is formed a circumferential by-pass extending approximately two-thirds of the distance around the wall and in communication with the outlet of the filter, although entirely disconnected with the inlet, and a plug valve which has an orifice extending transversely therethrough in which the filtering medium is placed, and having its exterior recessed approximately parallel with the transverse orifice for the purpose of connecting the inlet with the circumferential by-pass when it is desired to by-pass the water around the filter.

In the accompanying drawings:

Figure 1 is a longitudinal section through the filter when acting as a filter;

Fig. 2 is a vertical section taken at right-angles to Fig. 1 showing the plug valve adjusted to by-pass the water around the filtering medium;

Fig. 3 is a view similar to Fig. 2 showing the filter-valve closed.

A, represents the main portion of the filter. This has an enlarged center which is counterbored to form a slightly tapered chamber 1, which extends transversely nearly through the casing, and a small concentric hole 2 continues on through the casing.

An inlet 3 opens into the upper end of the slightly tapered chamber, and a spout 4 discharges from the opposite end. A circumferential by-pass 5 is formed transversely in the wall of the slightly tapered chamber, communicating at its center with the spout and terminating at its ends a short distance from, and equidistantly from, the inlet 2.

The numeral 6 represents the filter valve. This is in the form of a plug, which is ground to fit the slightly tapered chamber snugly and adapted to be turned therein. This plug has an orifice 7 bored diametrically therethrough, the diameter at one end of this hole being preferably slightly less than the main portion as shown at 8, and in this hole the filtering medium is placed. This may be of any approved material, but preferably of porous wood $a$ at either end, with an interposed layer of felt $b$.

At opposite sides, the plug is provided with recesses 9 adapted to connect the inlet and by-pass when the water is passing through the filter without being filtered, which is sometimes desirable.

The plug is provided with a stem 10 which passes through the hole 2, where it receives the washer 11, preferably keyed thereon against turning, and a nut 12 which holds the washer securely in place, and when screwed tight retains the filter-valve in its operative position.

The filter-valve is provided with a handle 13 by which it is adjusted, and the filter has a screw-threaded socket at its upper end provided with an angular exterior to receive a wrench whereby it is screwed to the plug 15.

The handle 13 on the filter-plug is preferably so placed, that is parallel with the hole, that it is an indicator of the position of the filter. When in vertical position, the filter is adjusted for operation, and, when it is desired to reverse the filter for cleaning, the plug-valve is simply given a half turn, but if it is desired to shut the filter off and by-pass the water the handle is placed at an angle of approximately 45°. Should it be desired to close the filter-valve entirely, the handle is turned to a horizontal position. This handle is of such a construction that it can be either grasped and turned by the thumb and finger, or can be turned by a wrench applied thereto, or by some tool inserted therethrough.

In this way, we have provided a filter of few, simple and substantial parts, easy to construct, simple in mechanism, efficient in operation, and sanitary in results, which can be manufactured at a comparatively small initial cost, and capable of quick attachment to any standard threaded house faucet.

We claim:

1. A faucet filter comprising a casing counterbored to form a slightly tapered chamber, a filter-valve fitted to this chamber, the filter provided with an inlet and outlet leading to and from the tapering chamber, said tapering chamber provided with a circumferential by-pass leading from the outlet part way to the inlet, the filter valve having a hole extending therethrough adapted to be filled with a filtering medium and having its outer wall recessed whereby to connect the inlet and by-pass when the valve is adjusted to throw the filter out of action.

2. A faucet filter comprising a casing counterbored to form a slightly tapered chamber, a filter-valve fitted to this chamber, the filter provided with an inlet and outlet leading to and from the tapering chamber, said tapering chamber provided with a circumferential by-pass leading from the outlet part way to the inlet, the filter valve having a hole extending therethrough adapted to be filled with a filtering medium and having its outer wall recessed whereby to connect the inlet and by-pass when the valve is adjusted to throw the filter out of action, the filter-valve having a handle which extends in the direction of the filter medium, whereby to indicate from the exterior the adjustment of the valve.

3. As an article of manufacture, a faucet filter made in two main pieces, one having a threaded socket for adjustment to the faucet at one end and a spout at the other end, a slightly tapered circular chamber at the center, in the wall of which a circumferential by-pass is formed in communciation with the spout, and a filter valve in the form of a plug which fits the circular chamber and which has a hole extending diametrically therethrough, and which is filled with a porous and filtering medium.

4. As an article of manufacture, a faucet filter made in two main pieces, one having a threaded socket for adjustment to the faucet at one end and a spout at the other end, a slightly tapered circular chamber at the center, in the wall of which a circumferential by-pass is formed in communication with the spout, and a filter valve in the form of a plug which fits the circular chamber and which has a hole extending diametrically therethrough, and which is filled with a porous and filtering medium, the valve having a recessed exterior adapted to connect the inlet and by-pass when the device is not to be used as a filter.

5. In a faucet filter, the combination with a casing having an inlet and a threaded socket at one end, and a spout at the other, and provided approximately at the center with an enlarged slightly tapered circular chamber, the wall of said chamber provided with a circumferential by-pass in communication with the outlet and not in communication with the inlet, of a filter-valve in the form of a slightly tapered plug fitted to the wall of the chamber and provided with a hole which extends diametrically therethrough and is provided with a porous filtering medium, the opposite sides of this plug recessed for connecting the inlet and by-pass when the filter-valve is set at a certain position, means whereby the valve is turned, and means for fastening the valve securely in the chamber.

In testimony whereof we affix our signatures.

ARTHUR C. GORTON.
GEORGE R. CARR.